United States Patent [19]

Teller

[11] 4,049,399
[45] Sept. 20, 1977

[54] TREATMENT OF FLUE GASES

[75] Inventor: Aaron Joseph Teller, Westboro, Mass.

[73] Assignee: Teller Environmental Systems, Inc., Worcester, Mass.

[21] Appl. No.: 652,634

[22] Filed: Jan. 26, 1976

Related U.S. Application Data

[63] Continuation-in-part of Ser. No. 564,771, April 8, 1975, abandoned, which is a continuation-in-part of Ser. No. 463,652, April 25, 1974, Pat. No. 3,957,464.

[51] Int. Cl.$^2$ .................... B01D 53/06; B01D 53/34
[52] U.S. Cl. ........................................ 55/73; 55/74; 55/79; 55/89; 55/94; 55/223; 55/228; 423/225
[58] Field of Search ............... 55/63, 68, 73, 74, 76, 55/77, 79, 89, 90, 93, 94, 223, 226, 228, 229; 423/223

[56] References Cited

U.S. PATENT DOCUMENTS

| | | | |
|---|---|---|---|
| 2,823,766 | 2/1958 | Maslan | 55/74 X |
| 2,886,131 | 5/1959 | Conlisk et al. | 55/74 X |
| 3,532,595 | 10/1970 | Arnesjo et al. | 55/89 X |
| 3,598,521 | 8/1971 | Alley | 55/73 X |
| 3,635,000 | 1/1972 | Brown | 55/89 |
| 3,701,824 | 10/1972 | Prahacs et al. | 423/225 |
| 3,798,309 | 3/1974 | Knowles et al. | 55/73 X |
| 3,849,541 | 11/1974 | Bertrand | 55/73 X |
| 3,874,858 | 4/1975 | Klugman et al. | 53/233 X |
| 3,907,523 | 9/1975 | Melin, Jr. | 55/73 |

Primary Examiner—John Adee
Attorney, Agent, or Firm—Thompson, Birch, Gauthier & Samuels

[57] ABSTRACT

Process and apparatus are disclosed for the treatment of flue gases to remove particulates, sulfur oxides, hydrogen sulfide and organic sulfur compounds using an alkaline scrubbing liquor containing activated carbon.

37 Claims, 6 Drawing Figures

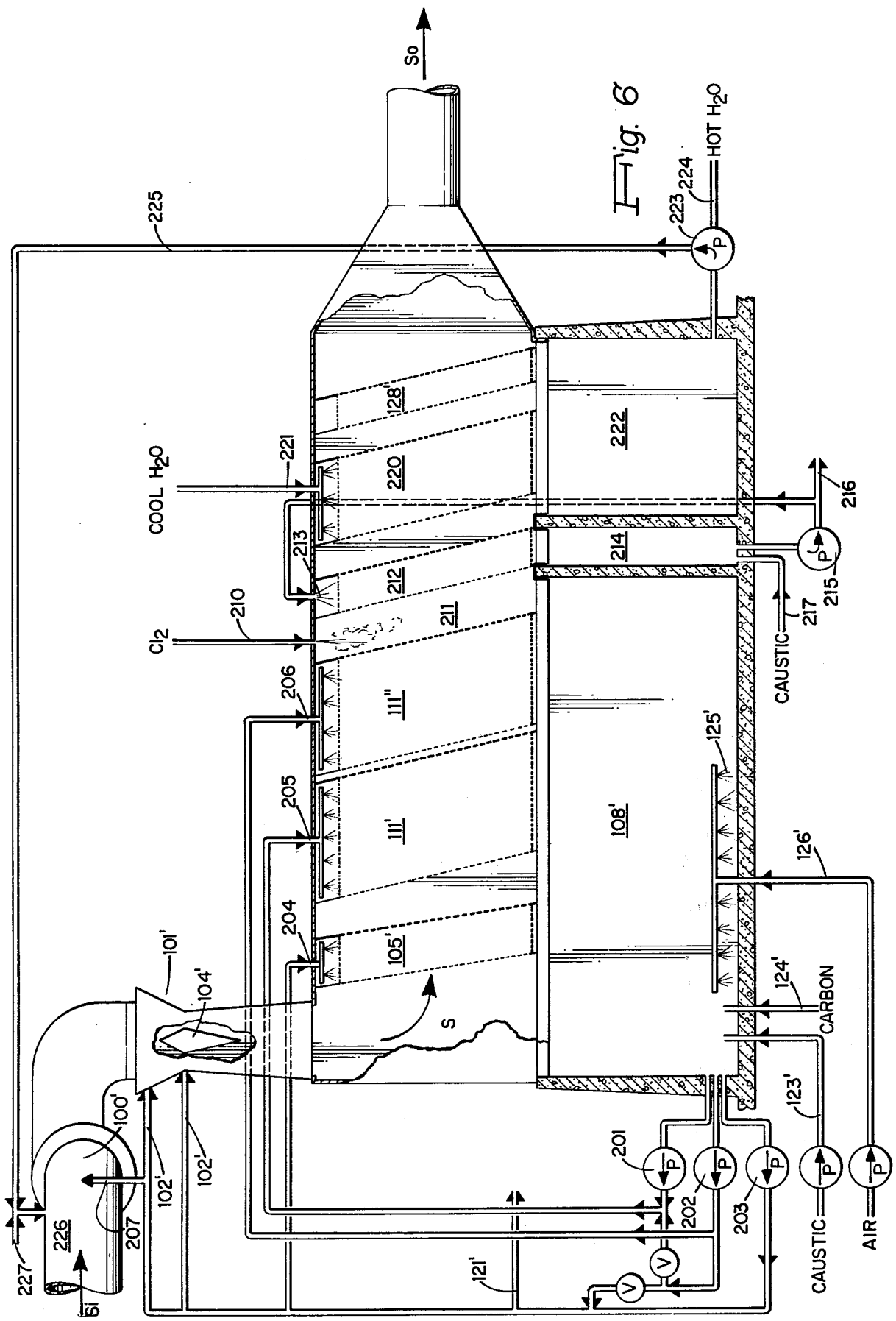

TREATMENT OF FLUE GASES

CROSS-REFERENCE TO RELATED APPLICATION

This application is a continuation-in-part of United States Application Ser. No. 564,771, filed Apr. 8, 1975 now abandoned, which Application Ser. No. 564,771 was a continuation-in-part of United States Application No. 463,652, filed Apr. 25, 1974 now U.S. Pat. No. 3,957,464, both prior applications being by the same inventor.

BACKGROUND OF THE INVENTION

This invention relates to a relatively simple efficient and economical process for removing particulates and gases such as sulfur oxides, hydrogen sulfide and organic sulfur compounds from an industrial gas stream. Mixed emissions of this type are commonly found, for example, in Kraft and sulfite recovery processes in the pulp and paper industries. Prior art processes teach various methods of removing these types of emissions individually, however, none of the prior art teaches an economical coordinated process for the removal of all of these components. Furthermore, in some cases, a prior art process for the removal of one component interferes with or reduces the efficiency of subsequent removal steps for other components.

For example, emissions from Kraft recovery boilers typically consist of hydrogen sulfide and organic sulfur compounds (designated "TRS" for total reduced sulfur), $SO_2$ and particulates. The organic sulfur compounds typically consist of mercaptans such as methyl mercaptan ($CH_3SH$), mercapto ethers such as dimethyl sulfide ($CH_3SCH_3$), and disulfides such as dimethyl disulfide ($CH_3S\cdot SCH_3$). Some references indicate the presence of carbonyl sulfide (COS). The quantity and composition of emissions are a function of boiler feed and loading, boiler operation, and process sulfidity.

Emissions from boilers are generally in the broad range of:

TRS: 10–2500 PPM (parts per million)
Particulates: 1–7 gr/sdcf (grams per standard dry cubic foot)
$SO_2$: 10–200 PPM (parts per million).

The permissible emissions from recovery boilers are, increasingly, being restricted by govenment authorities. Although the level of restriction varies with the specific authority, the emerging standards for 1977 appear to be TRS less than 5 PPM and particulates less than 0.08 to 0.04 gr/sdcf.

In some new boiler designs, TRS emissions can be controlled to 3–10 PPM when operating at 80–100% of design capacity, but only with close combustion control and decreased thermal efficiency. Also, particulate emissions present more of a problem with this type of design. Black liquor oxidation processes in combination with existing furnaces can, with close control, maintain TRS emissions at 4–30 PPM when operating at 80–100% of design capacity, but the particulate emissions problem still exists. Electrostatic precipitators in existing recovery boilers, after an extended period of operation such as 3–5 years, are reducing particulate emissions to levels of 0.10–0.25 gr/sdcf at 80–100% of design capacity. When the boilers are operated at 120% of design capacity, however, the particulate emissions level in many cases increases to more than 1 gr/sdcf. None of these systems can readily accommodate fluctuating boiler load levels. Furthermore, electrostatic precipitators in themselves do not control TRS emissions. Therefore, it appears that neither electrostatic precipitators alone, black liquor oxidation alone, nor a combination of these two well-evaluated systems, are consistently capable of meeting the overall environmental regulations.

Recently, experimental work has been conducted on the absorption of sulfur oxides and other sulfur compounds in alkaline slurries of activated carbon. In particular, U.S. Pat. Nos. 3,701,824; 2,823,766; 3,486,852; and 3,824,163 teach that water slurries of activated carbon can be used to scrub sulfur dioxide, hydrogen sulfide, and organic sulfur compounds such as mercaptans and alkyl sulfides from a gas stream. These patents appear to depend on a combination of sorption and oxidation processes. In general, these patents teach a carbon slurry concentration of about 0.1–10% by weight or higher for the cocurrent or countercurrent scrubbing of sulfurous gases having hydrogen sulfide or organic sulfur compound concentrations on the order of 100–5000 PPM. These patents do not discuss the problem of the removal of particulates.

Other prior art patents disclosing alkaline scrubbing reactions are U.S. Pat. Nos. 3,852,408; 3,852,409 and 3,755,990.

U.S. Pat. No. 3,324,630 teaches a process for removal of particulates from a gas stream which utilizes a crossflow scrubbing technique, and the disclosure of this patent is incorporated herein by reference. The process disclosed is capable of removing very small particulates on the order of 0.1–10 microns in size.

In the aforementioned U.S. Patent Application Ser. No. 463,652, an improvement in scrubbing is disclosed wherein the particulate-laden gas stream is first treated under substantially adiabatic conditions to increase its turbulence and to increase its humidity substantially to saturation at a temperature above about 150° F to initiate nucleation of small particulates by condensation and/or agglomeration. Thereafter the gas is contacted with a scrubbing liquor which can be recirculated through a packed enclosure, usually at a substantially constant temperature. This improvement normally eliminates the need for cooling the recirculating liquor at a saving in material and energy costs.

OBJECTS OF THE INVENTION

Accordingly, it is a primary object of the present invention to provide a coordinated and economic process for the removal of particulates and acid gases from a hot effluent gas stream.

It is specifically an object of this invention to provide a process for scrubbing particulates, sulfur dioxide, hydrogen sulfide and organic sulfur compounds from a gas stream with an aqueous alkaline carbon slurry in a process which requires a lesser concentration of carbon than has heretofore been possible.

It is also an object of this invention to provide a wet scrubbing process for the removal of particulates which does not normally require the cooling of recycled scrubbing liquor.

It is further an object of this invention to provide a process for scrubbing particulates and sulfurous gases from a gas stream as described wherein efficient removal is obtained at a minimum caustic and carbon

BRIEF DESCRIPTION OF THE DRAWINGS

FIG. 6 is a schematic view of a further embodiment of gas treatment apparatus according to this invention illustrating optional additional treatment steps and apparatus.

FURTHER DESCRIPTION OF THE DRAWINGS

Figure 1:
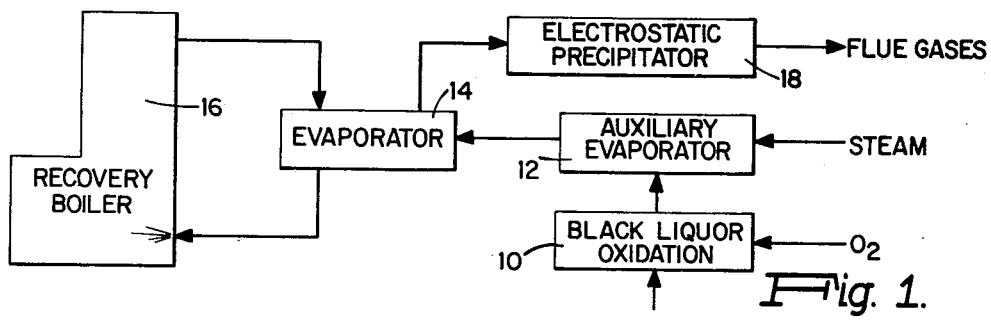
FIG. 1 is a flow sheet illustrating the evaporation and recovery boiler portions of a typical pulping process producing an effluent flue gas containing particulates and sulfur-containing gases.

FIG. 1 schematically illustrates one type of recovery boiler operation as employed in pump manufacture. The liquid containing sulfur compounds and cellulose-lignin organic materials, called "black liquor", from a digester (not shown) is fed into a balck liquor oxidation chamber 10 where it is exposed to oxygen. The oxidized black liquor is then fed to a stream-heated evaporator 12 and a direct contact evaporator 14 where water is evaporated to concentrate organic material to combustible levels. The concentrated black liquor is then sprayed into a recovery boiler 16 where the organic material is burned to recover heat and chemicals. The hot effluent exhaust gases, treatment of which is one object of the present invention, are then fed back to evaporator 14 to recover heat, and thence through an electrostatic precipator 18 to remove particulates. The gas exiting the electrostatic precipitator (not always employed) contains particulates, $SO_2$ and TRS, principally hydrogen sulfide but also frequently containing organic sulfur compounds as hereinbefore described.

Figure 2:
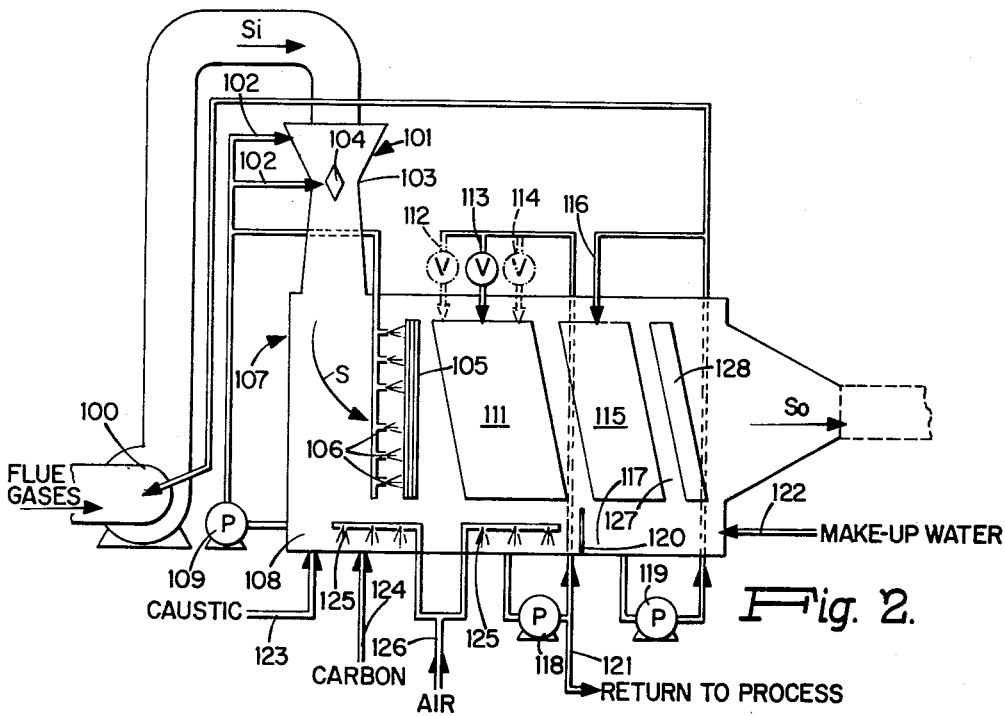
FIG. 2 is a schematic view of one embodiment of gas treatment apparatus of this invention.

Referring now to FIG. 2, the hot inlet gas stream $S_i$ is typically at a temperature of about 300°–500° F and a dew point of about 150°–185° F. The gas stream may have previously been treated for preliminary particle removal by conventional methods discussed hereinafter. The stream $S_i$ is directed by means of a washed fan 100 at a velocity of about 50 fps into a venturi 101. The gas is subjected to a liquid spray quench 102 prior to and/or simultaneously with reaching the venturi throat 103. A plug 104 having an essentially diamond-shaped cross-section may be inserted in the venturi throat and has been found to improve the efficiency of recovery. Venturi 101 is operated at a lower pressure drop of the gas therethrough than more conventional venturis heretofore employed to remove particulates. The pressure drop of the gas therethrough is less than 20 and preferably less than about 10 inches of water. In particular, the use of a venturi with a diamond-shaped plug as shown has been found to facilitate the removal of intermediate-sized particles larger than about 0.8 microns at this stage of the process, and such particles drop out of the gas stream either by action of gravity or by impinging contact with the spray formed in the venturi throat 103. The captured particles form a slurry in the quench liquor, or, if soluble, dissolve therein.

The turbulent gas stream S, cooled but still at a temperature above 150° F and moisturized to near saturation by the action of the liquid quench, is next channeled through a set of baffles 105 which are continuously washed by a wash liquor from nozzles 106. The wash liquor is drained to the bottom of the apparatus where the solids may be separated by conventional means such as screen or settling tank means or left to form a slurry. The wash liquor is combined with the liquor from the venturi in sump 108 and is recirculated by pump 109.

Emerging from the baffle system, the gas is substantially saturated with water vapor at a temperature of at least about 150° F to 212° F and nucleation of submicron particles occurs. It should be noted that the increase in turbulence and saturation of the gas within the enclosure defined by venturi 101, baffles 105 and the walls of housing 107 occurs under substantially adiabatic or isoenthalpic conditions. No significant heat is added to or withdrawn from the gas, the heat of the gas being employed to vaporize the small amount of moisture required and the vaporization cooling the gas by lowering its dry bulb temperature. Under equilibrium operation, with recirculating quench and wash liquor, the temperature of the liquor and gas will be near the wet bulb temperature of the incoming gas.

The gas together with the entrained, nucleated particles is then passed in an essentially horizontal path through scrubber bed 111, packed with any suitable packing material, preferably the packing material disclosed in U.S. Pat. No. 2,867,425, also described in U.S. Pat. No. 3,324,630, and available commercially under the trademark "Tellerettes", more fully described hereinafter, where it is brough into crossflow contact with the scrubbing liquor which is continuously sprayed into scrubbing section 111 by nozzles 112, 113 and 114. Although FIG. 2 shows a single scrubbing section with three sets of nozzles, the number of sections, the size of the sections, and the number of nozzles per section is not critical and may be varied to suit individual process requirements. The gas is then passed through a second packed section 115 which is washed with recirculating wash liquid and makeup water from nozzles 116 to remove any entrained liquor containing TRS and solids. The sections shown in FIG. 2 are inclined at an angle of about 8°–13° from the vertical in the direction in which the gas is moving. Such a construction is not critical but helps to prevent maldistribution of the liquor in the packing and thus insures full use of the packed section. The scrubbing liquor and washing liquid from sections 111 and 115, respectively, together with particulates, are drained to the bottom of the respective sections through packing support gratings which are of such size that the packing is supported while the liquid and suspended particulates pass through and into collection sumps 108 and 117 respectively. Pumps 118 and 119 are used to recirculate the scrubbing liquor and washing liquid respectively. If desired, a single collection sump below the packed sections and venturi can replace sumps 108 and 117 and the liquor collected in the single sump can be recirculated by one or more pumps. Where two sumps are employed as shown, they can be separated by an overflow weir 120 whereby excess recirculating liquid, including fresh makeup water, can flow into sump 108. By this means, the concentration of salts and solids in the wash liquid in sump 117 can be maintained at a lower concentration than in the liquor in sump 108.

To replace liquids lost with the gas and withdrawn with slipstream 121, and to maintain the desired concentration of carbon and alkali during use, all as more fully explained hereinafter, fresh makeup water is supplied at 122, concentrated caustic is added at 123, and carbon slurry is added at 124. Also as more fully explained hereinafter, activated carbon in the liquor slurry in sump 108 is aerated through submerged nozzles 125 within the sump and fed at 126 through a compressor (not shown).

Advantageously, after leaving the scrubbing section 115, the gas stream is passed through an open drainage zone 127 to allow drippage of entrained water droplets followed by a demisting chamber 128. The demisting chamber is packed with any suitable packing material, preferably the same material used to pack the scrubbers. A subsequent demisting chamber may also be employed. The treated gas $S_o$ from the second enclosure defined by baffles 105 and the walls of housing 107, is substantially free of particulates larger than about 0.1 micron.

As shown in FIG. 2, a single pump 109 can be used to recirculate liquor for the baffle sprays 106 and the venturi quench 102. As a further pre-treatment, prior to the venturi and baffles, the gas stream can optionally be passed through washed fan 100 for additional increases in humidity and turbulence and to improve the wetting of the particulates. The fan can be washed with a portion of one of the recycled aqueous liquids, for example, the makeup water from pump 119 as shown in FIG. 2.

Figure 4:
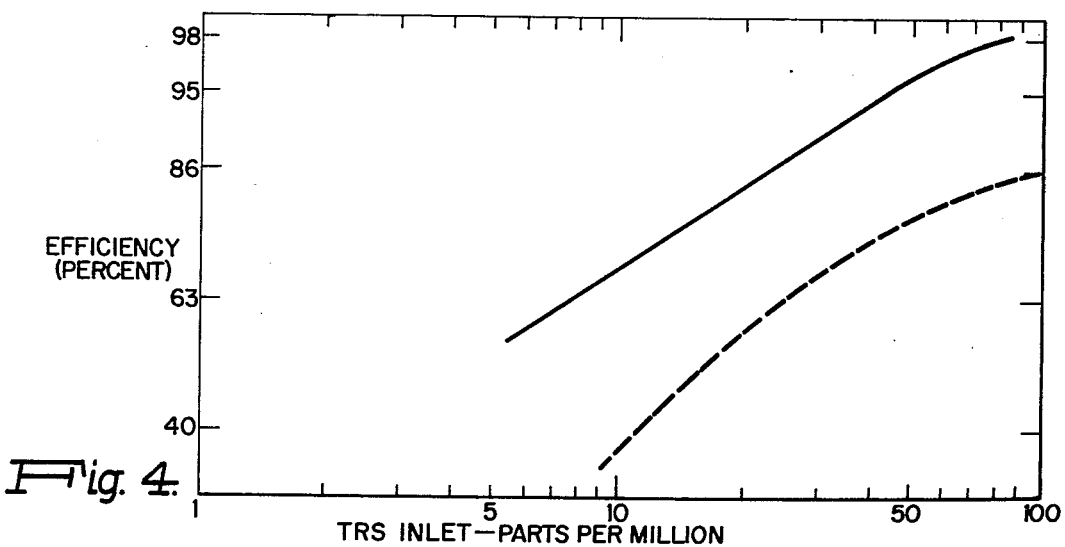
FIG. 4 is a graph comparing the efficiency of TRS removal by laminar contact scrubbing with that by a turbulent contactor.
Figure 5:
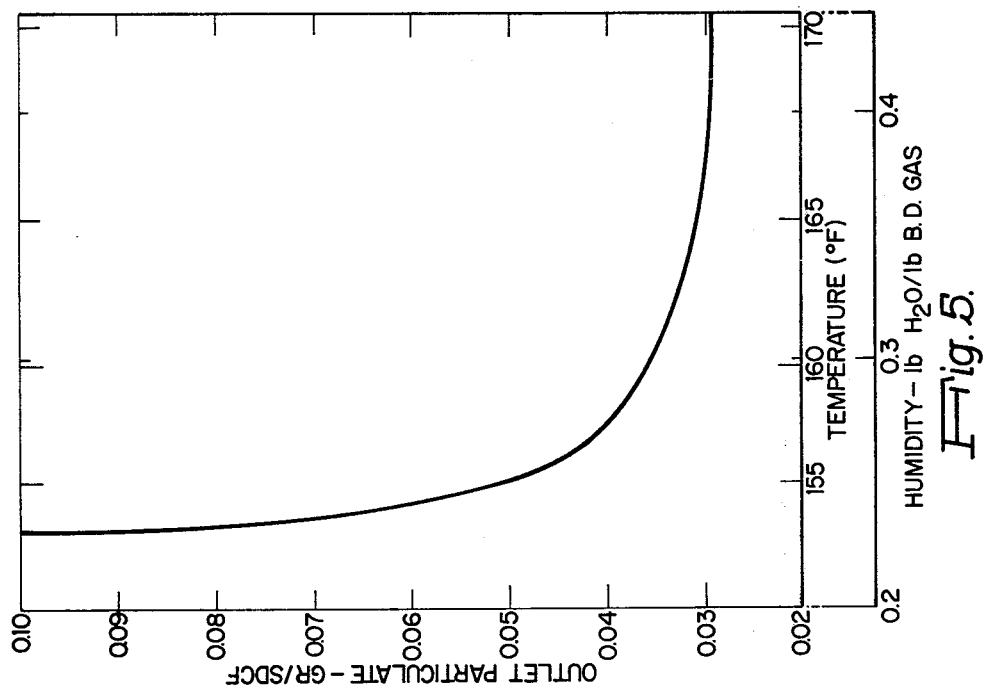
FIG. 5 is a graph comparing the efficiency of particulate removal in the process of this invention at different gas stream dew point temperatures.
Figure 3:
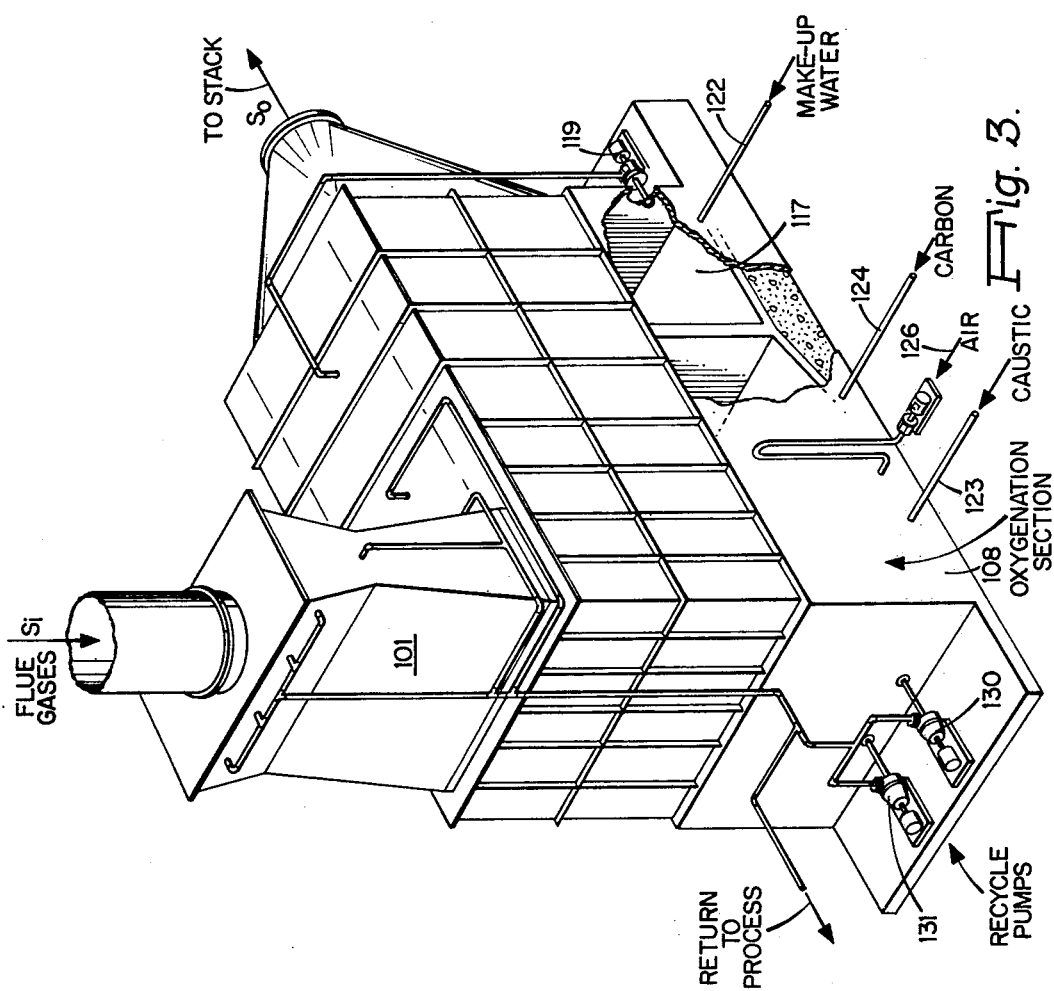
FIG. 3 is a partially-cutaway perspective view which illustrates the structure of one form of the apparatus shown schematically in FIG. 2.

FIG. 3 is a partially cut-away perspective view of a ground level installation similar to FIG. 2 and wherein like parts have like numbers. Pumps 109 and 118 have been rearranged to pumps 130 and 131. This figure illustrates that apparatus according to this invention can be combined in a single compact housing. FIGS. 4, 5 and 6 are described hereinafter.

DESCRIPTION OF THE PREFERRED EMBODIMENT

General Description

In general, the present invention comprises the following steps:

1. In a preliminary step, the hot particulate-laden gas containing a mixture of sulfur oxides, hydrogen sulfide, and organic sulfur compounds is treated by conventional means for the removal of particles larger than about 5 microns. Such means are well known in the art and include a cyclone separator, a spray tower, a venturi, an electrostatic precipitator, and a tray column, either alone or in combination. For example, the combination of a cyclone separator for the preliminary removal of particles and a crossflow scrubbing apparatus for the removal of very small particles is illustrated in U.S. Pat. No. 3,324,630. This step is optional since the subsequent steps set forth below will remove large as well as relatively small particles. However, if a significant quantity of particles larger than about 10 microns are present, the preliminary separation step will be more economical.

2. The hot gas, preferably containing only particles smaller than 10 microns in size together with various sulfur contaminants, is next subjected to a liquid quench immediately prior to or simultaneous with its passage through the low energy venturi. This treatment cools (although maintaining the temperature above 150° F) and moisturizes the gas to a point approaching saturation conditions and introduces additional turbulence in the gas. A wetted inlet fan can also be employed prior to the venturi.

3. The gas is next passed through a liquor-washed baffle system. This further cools (although still maintaining the saturation temperature above 150° F) and moisturizes the gas to substantial saturation and also creates additional mixing in the gas stream.

4. On leaving the baffle system the substantially saturated gas is at a temperature above about 150° F and these conditions have promoted rapid nucleation among particles down to an initial size of about 0.1 microns or less.

5. The gas stream is next passed through one or a plurality of packed scrubbing beds in crossflow contact with a scrubbing liquor. The preferred scrubbing liquor for this invention comprises an aqueous, alkaline suspension or slurry of activated carbon as more fully described hereinafter.

6. The gas stream is recovered from the scrubber unit essentially free of entrained particulate matter larger than about 0.30 microns and essentially free of sulfur compounds, the TRS concentration being generally less than about 5 PPM. The gas may then be exhausted to the atmosphere or further treated as follows.

7. Optionally, before discharge to the atmosphere, the residual TRS in the gas stream can be further reduced by a second oxidation and scrubbing step, described and illustrated hereinafter, and/or the gas can be passed through a further packed crossflow section wshed with cool water to recover heat and further red uce particulates. Thereafter, if desired, the gas can be passed through a suitable demisting chamber to remove entrained droplets of liquid, for example, a unit packed with the same material as the scrubbers but which is not washed with any liquid.

Although the nucleation mechanism for fine particulates is not thoroughly understood, it is believed to involve condensation of moisture on the fine particles and their agglomeration by collision with and bonding to other such particles, thereby increasing their effective size. Fine particulates are also thought to have a surface electrostatic charge by virtue of their high surface to mass ratio. Such charges are believed to assist in the nucleation process.

Adiabatic or isoenthalpic nucleation as herein disclosed and as disclosed in U.S. Patent Application, Ser. No. 463,652, is a function of essentially three variables, the moisture content of the gas, the turbulence of the gas, and the temperature of the gas. Thus it has been found that adiabatic nucleation is not effective below about 150° saturation temperature and that higher gas saturation temperatures compensate, in part, for a lesser degree of turbulence in the gas and vice versa. An increase in turbulence in the incoming gas, to a Reynolds number of at least 3000, and preferably of at least 10,000 or more at the time of cooling to saturation is necessary. With higher saturation gas temperatures, either the venturi or baffles, or both, can in some applications be omitted, although both are preferred. Thus, where the incoming gas has a saturation temperature of about 190° F to 212° F, the venturi can be omitted. At close to 212° F saturation temperature, both the venturi and baffles can be omitted and a series of water jets employed. For a given set of operating conditions, the turbulence of the gas can be varied experimentally to optimize results. While it is technically feasible to raise the saturation temperature of an incoming gas stream to a point requiring minimum turbulence, the cost of doing so is ordinarily prohibitive. Turbulence, however, can be increased comparatively inexpensively.

The packing elements or units that operate most satisfactorily in the process and appartus of this invention are disclosed in applicant's U.S. Pat. Nos. 2,867,425 and 3,324,630 and are available commercially under the trademark "Tellerettes". "Tellerettes" provide a filamentous packing having little continuous extensive surface and about 80–85% free volume therein; the packing consisting of randomly arranged, interlocked tower packing units, the units being made up of approximately circular, integrally connected filament portions having their axes approximately tangent to a circle at approximately evenly spaced points therearound, the number of such spaced approximately circular portions being from 6 to 12 and the diameter of such circle being approximately equal to the diameter of one of such approximately circular filament portions plus the diameter of a smaller circle whose circumference is not less than the cross-sectional dimension of the filament portion in the direction of its axis times the number of such filament portions and not greater than the circumference of one of such approximately circular filament portions. Such packing units are hereinafter referred to in the description and claims as "toroidal elements" which terms are to be understood as incorporating therein the above description by reference.

The preferred scrubbing liquor for this invention is alkaline aqueous slurry of activated carbon having a particle size range preferably in the range of 0.05–10 microns and a pH of about 8–13, more preferably 8–9.5, and most preferably about 9.0–9.3. The alkaline material in the scrubbing liquid may be soluble sodium or potassium salt such as sodium hydroxide, sodium carbonate, or the like or a relatively insoluble alkaline earth metal salt such as lime or calcium carbonate in slurry form. Sodium hydroxide is preferred.

The removal of $SO_2$ and TRS by the scrubbing liquor is based on sorption and chemical reaction with hydroxide and oxygen. $SO_2$ is converted to sulfates and TRS to oxidized sulfur compounds. $H_2S$ for example is converted at least in part to $Na_2S_2O_3$. Such compounds are not volatile and can be recirculated in the scrubbing liquor as dissolved or suspended salts. In addition to the oxidized materials, the scrubbed particulates, principally carbonates and sulfates of sodium, recirculate with the scrubbing liquor.

Maximum recirculation of scrubbing liquor is an important part of the present invention for reasons of cost and efficiency. With prior art processes the highest solids or non-volatile content, i.e., the content of materials which are essentially non-volatile at 212° F, that can be recirculated is about 15% by weight. With the present process, however, the non-volatile content may be as high as 25% and is preferably in the range of 20–25% by weight. The crossflow scrubber of this invention is stable at such high content.

Crossflow scrubbing has other important advantages in the present invention. The ratio of scrubbing liquor to gas flow rates can be varied along the depth of the packing, i.e., in the direction of gas flow, as can the size of the packing elements. Also different liquors of different composition or concentration can be employed and recirculated. Preferably, higher flow rates of the same scrubbing liquor are employed in upstream portions of the packing where the $SO_2$ and TRS concentrations in the gas are highest. Thus the ratio of alkali (and oxygen) to $SO_2$ and TRS (and acid particulates such as $NaHSO_4$) concentrations in the gas can be varied with the depth of packing. For example, in FIG. 2, the valves controlling nozzles 112, 113 and 114 can be adjusted to provide a high flow rate through nozzle 112, a lower rate through nozzle 113, and still a lower rate through nozzle 114. Under some conditions it has been found that, based on the same total flow rate, such a distribution of scrubbing liquor will be more efficient than an even distribution. Similarly, it is sometimes desirable to employ larger packing elements, e.g. 2 inch toroidal elements, in upstream portions of the packing and smaller elements, e.g. 1 inch toroidal elements in downstream portions.

Sufficient alkali and carbon are required for efficient reaction and removal of contaminants but excess should be avoided for economy and to limit corrosion. Alakline pH is necessary but the pH should be below about 9.5, and preferably 9.3, to avoid reaction with $CO_2$. With well-oxygenated, activated carbon, a carbon content between about 0.03% and 0.20% by weight is suitable and about 0.05% to 0.15% is preferred. These values are lower, for a given removal efficiency, with the present invention than with prior processes because the scrubbing liquor flow in the crossflow scrubber is laminar over the packing, rather than turbulent. With laminar flow it is believed that the suspended carbon migrates to the surface of the flowing liquor and concentrates in the most active portion of the scrubber liquor, that is, the portion in contact with the gas. Below about 200 PPM of TRS in the gas, it has been found that a bulk concentration of carbon in the weight range of about 0.03% to 0.07% is sufficient and above 200 PPM TRS, a range of about 0.08% to 0.15% is sufficient. Thus a carbon concentration range between about 0.03% to about 0.20% by weight is preferred, the particular value selected being a function of operating conditions and TRS inlet concentration in the gas.

To maintain the non-volatile concentration in the recirculated scrubbing liquor, a slipstream of liquor is bled off and returned for processing to the material balance of the pulp process. The high non-volatile concentration in the slip-stream permitted by this invention is advantageous because a minimum of carbon and unreacted alkali are thereby withdrawn with the slipstream and less heat is required to remove water for concentrating the salts recovered in the slipstream. Fresh makeup water and fresh alkali and carbon are added as required to maintain pH and carbon concentration in the scrubbing liquor.

For the reasons given above, the consumption of alkali and carbon in the present invention are low, generally in the range of 0.3 to 0.6 pounds carbon and about 9 to 25 pounds of alkali, measured as NaOH, per ton of air dried pulp processed, depending on the specific process conditions and control, and the type of wood being pulped. These relatively low values are important since such consumption is estimated to constitute the largest single item of cost in operating the process, including amortization of equipment. Properly operated, it is estimated that the economic value of recovered salts returned to the pulping process can exceed the total cost of operating the flue gas treating process of this invention.

The present invention also has a low cost for power and heat since the nucleation step requires low power and essentially no heat, while the scrubbing step preferably is operated without significant cooling of either the gas or scrubbing liquor, except incidentally in withdrawing of slip-stream and adding of makeup materials. Crossflow scrubbing also has an inherently low pressure drop for the gas such that the entire process can be operated with a gas pressure drop below about 30 inches of water, and typically less. Thus the entire process is substantially adiabatic throughout and, so operated, can reduce the particulates in the exhaust gas to about 0.03 gr/sdcf. If further reduction is desired, the gas can be exposed to a cooling liquid, either the scrubbing liquor itself as shown in U.S. Pat. No. 3,324,630, or fresh makeup water as described herein, in either the whole of the packing of the scrubber, a portion thereof, or a separate packed section. By such cooling, where desired, particulates can be further reduced to about 0.01 gr/sdcf.

The cross sectional area of the packed scrubber is chosen to accommodate the flow rate of gas to be treated and the depth of packing, with respect to the direction of flow of the gas, is chosen to provide the required removal of contaminants to the extent desired, greater depth providing increased removal within the limits of the process. The required depth can be provided in continuous or separated sections. Scrubbing liquor flow rates are chosen to maintain laminar liquid flow over the surface of the packing, and can be varied along the depth of packing as described.

The following examples further illustrate the present invention.

EXAMPLE I

A series of tests were performed in an integrated recovery apparatus as illustrated in FIG. 2 with flue gases from a Kraft recovery process as illustrated in FIG. 1. Gas and process operating conditions are given in TABLE 1. The pressure drop of the gas in the venturi was in the range between 4 and 10 inches of water, and in the total scrubber between 7 and 13 inches of water. The depth of the packing was about 5 feet and the scrubbing liquor flow rate was varied along the depth to provide greater flow upstream of the gas than downstream.

The system was found to be capable of a 2:1 turndown, providing desirable flexibility of operation, and was relatively insensitive to variations in liquid and gas flow rates. During testing, including operation 24 hours per day 7 days per week, no solids build up, no increase in pressure drop, and no adverse conditions such as undue foaming were observed.

TABLE 1

| Gas Conditions | Inlet | Outlet |
|---|---|---|
| Gas Flow (acfm) | 235,000 | 200,000 |
| Temp. (° F) | 300 | 163 |
| Conc. $SO_x$[1] (PPM) | 50–150 | 5–10 |
| Conc. Particulates (gr/sdcf) | 1.5 | 0.02–0.06 |
| TRS (PPM) | 600 | 3–5 |

[1]$SO_x$ is used to denote mixed sulfur oxides, predominantly $SO_2$.

| Scrubbing Liquid | Inlet | Outlet |
|---|---|---|
| Liquid Flow (gpm) | 3760 | 3713 |
| Temp. (° F) | 167 | 167 |

TABLE 1-continued

Venturi quench liquid — 2200 gpm at 163° F
Baffle wash liquid — 700 gpm
Make-up water — 50 gpm
Make-up NaOH — 200–1000 lbs./hr.
Make-up carbon — 5–15 lbs./hr.
Air for oxygenation — approx. 1500 cfm
Recycle liquid:  20 gpm
                 22% solids
                 0.1% carbon
                 pH 9.3 acfm — actual cubic feet per minute
PPM — parts per million
gr/scdf — grains per standard dry cubic foot of gas
gpm — gallons per minute
TRS — total reduced sulfur

EXAMPLE II

The purpose of this example was to compare the process of this invention with that taught by U.S. Pat. No. 3,701,824, and in particular, to compare the efficiency of a turbulent contactor with the crossflow scrubbing process of this invention at low levels of TRS emissions. The data for this example were obtained from tests at TRS levels of about 10–100 PPM using two crossflow scrubbers and one turbulent contactor having the following characteristics:

TABLE 2

| Recovery Unit | ΔP | Carbon Slurry — wt. % |
|---|---|---|
| Crossflow Scrubber | ~10 | 0.03–0.06 |
| Turbulent Contactor | ~16 | 0.5 |

The results of these tests were plotted on the basis of efficiency (on a logarithmic scale) against TRS concentration as shown in FIG. 4 wherein the solid curve represents the cross-flow data and the broken curve the turbulent contactor data. These tests demonstrate the superior efficiency of the crossflow scrubber in removal of TRS emissions despite a ten-fold reduction in the concentration of carbon in the slurry. Furthermore, these data show that the crossflow scrubbers operated at about a 30% less pressure drop, therefore requiring less power than the turbulent contactor.

EXAMPLE III

The purpose of this example is to demonstrate the variation of caustic consumption and thermal requirements at varying concentrations of dissolved solids (non-volatiles) in the recycle scrubbing liquor in the stable crossflow scrubber of this invention. The data was obtained from a high emission boiler having the following characteristics:

Operating Level — 600 TPD
TRS — 500 PPM av.
Particulate — 1.5 gr/sdcf
Gas Flow — 200,000 acfm 160 F Sat.

The results are shown in Table 3 below:

TABLE 3

| Recycle Liquor — Dissolved Solids (% Concentration) | Slip-stream rate (GPM)* | Unreacted NaOH loss (lb/ton of pulp) | Thermal Load For Conc. to 50% Solids (BTU/Hr.) |
|---|---|---|---|
| 5 | 90.5 | 26 | 42.8 × 10⁶ |
| 10 | 47.6 | 13.7 | 21.5 × 10⁶ |
| 15 | 27.0 | 7.8 | 11.1 × 10⁶ |
| 20 | 19.1 | 5.5 | 7.2 × 10⁶ |
| 25 | 14.3 | 4.1 | 4.8 × 10⁶ |

*Required to maintain solids concentration

EXAMPLE IV

This example demonstrates the effectiveness of this invention in particulate removal, the variation of effectiveness with gas saturation temperature, and the criticality of a gas temperature above about 150° F.

A series of tests were conducted at different gas saturation temperatures between 155° F to 172° F, without cooling the recycled scrubbing liquid, and with particulate loading ranging from 0.17 to 0.54 gr/sdcf. The recovery boiler effluent was pre-treated with an electrostatic precipitator to remove larger particles prior to entering the scrubbing unit. These results are plotted in FIG. 5. The smothed curve indicates a particulate emission ranging from 0.050 gr/sdcf at an operating temperature of 155° F to 0.024 gr/sdcf at an operating temperature of 172° F, well within the proposed 1977 standard of 0.08 gr/sdcf.

EXAMPLE V

Tests similar to Example IV were conducted with a recovery boiler effluent gas pre-treated in a direct contact evaporator. Duct thermal loss prevented conducting tests at adiabatic temperatures above 162° F. However, with inlet loadings ranging from 0.8 to 3.0 gr/sdcf and with the scrubber system operating at 16 to 19 inches of water, particulate emissions were reduced to 0.11 gr/sdcf. The particles from the evaporation were found to have hydrophobic coatings; therefore, to accelerate the initial wetting of these particles, additional turbulence was induced in the gas prior to the scrubber. With added turbulence prior to scrubbing, particulate emissions were reduced to the other of 0.03 to 0.04 gr/sdcf, again well within proposed 1977 standards.

By means of the process steps and apparatus illustrated and described above, the treated flue gases will be at a saturated temperature above about 150° F and have a low concentration of particulates and TRS, suitable for exhausting in compliance with existing governmental regulations. However, the treated gases contain valuable heat. Also, it may be desirable in some cases to reduce TRS and/or particulates still further. Optional steps to recover heat and/or further reduce TRS and particulates are described below.

Waste heat may be recovered by passing it in heat exchange relation to a cooling fluid. In the present invention, it is both convenient and advantageous to recover heat by passing the gas in crossflow contact with another packed section of scrubber washed with clean, or relatively clean, cool water. The additional scrubber section or enclosure can be provided in the same housing as the other sections and the heated water can be sent to the pulp process for utilization. The thus heated water, after extraction of its heat to re-cool it, can be recirculated if desired. Compared with conventional heat-exchangers or co-current or counter-current towers, the cross-flow recovery unit is smaller, cheaper, less subject to corrosion and has a lower pressure-drop and power requirement. Also, the water can be heated to approximately the temperature of the inlet gases to the section, unlike conventional exchanges and co-current towers. Further, the sump below the unit for collecting the heated water can be segregated into two or more portions along the direction of gas flow to provide water of increasing purity, downstream portions being less contaminated than upstream portions. The cool water will remove addition particulates from the gas and become contaminated thereby, especially if the water is recirculated.

It has been further discovered that the TRS in the treated flue gases, generally below about 5 PPM, can be further reduced by a second oxidative treatment by means of an oxidizing agent more powerful than oxygen. The products of this second oxidation, together with any excess oxidizing agent, are scrubber from the gas in an additional crossflow scrubber section with a circulating alkaline scrubbing liquid similar to the scrubbing liquor employed in the previous sections, but omitting activated carbon.

Preferably, the oxidizing agent means employed in the second oxidation is a chlorine-containing gas, such as $Cl_2$ or $ClO_2$, which is often employed in bleaching operations in pulp processing. This gas can be mixed with the previously treated flue gases in advance of the additional scrubbing section. A slip-stream of the recirculating scrubbing liquid can be sent to the pulp bleaching operations for use, especially where the oxidizing agent employed is the same as that used in the bleaching process. Alternatively, bleaching agent means such as an alkali metal, preferably sodium or potassium, or alkaline earth metal, hypochlorite, permanganate or chromate; or chromic acid can be dissolved or dispersed in the alkaline scrubbing liquid employed in the additional scrubbing section.

Further oxidative reduction of TRS concentration and the recovery of heat are both illustrated in FIG. 6. Flue gases $S_i$ are fed by means of fan 100' into venturi 101' having a diamond-shaped insert 104'. Thereafter the gases S are passed through baffles 105' which in this embodiment comprise a crossflow section packed with elements, preferably toroidal elements, which are larger, e.g. 3 inches in diameter, than the elements employed in succeeding sections. In passing through venturi 101' and baffles 105', the turbulence of the flue gases is increased and they are cooled to saturation, causing nucleated particulates to form.

Following passage through baffles 105', the flue gases pass through scrubbing sections 111' and 111" packed with toroidal elements, e.g. 2 inch and 1 inch elements, respectively. Sections 111' and 111" are washed with an alkaline aqueous liquor containing oxygenated, activated carbon as more fully described in connection with the preceding embodiment. The scrubbing liquor is collected and recirculated from a single sump 108' and no separate washing section (115 of FIG. 2) is employed. Liquid from sump 108' is circulated by means of pumps 201, 202 and 203 to sprays 102' for the venturi 101', spray 204 for baffles 105', sprays 205 and 206 for scrubbing sections 111' and 111", and spray 207 for the blades of fan 100'. To maintain liquor concentration, a slipstream 121' is returned to the pump process, and fresh caustic and carbon are added as needed at 123' and 124', respectively. Compressed air from a compressor (not shown) is introduced at 126' to nozzles 125' submerged in scrubbing liquor in sump 108'.

The flue gases exiting from primary oxidizing scrubbers 111' and 111" will generally contain residual TRS, less than about 5 PPM, and a low concentration of fine particulates. To further reduce these concentrations, an oxidizing gas more powerful than oxygen is fed at 210 into the space 211 between scrubbing sections 111" and 212. Preferably, this gas is chlorine, which mixes with the flue gas and causes further oxidation of the residual TRS. Sufficient chlorine should be employed for oxidation, but the required amounts are small in view of the low concentrations of TRS being treated.

Following admixture and treatment with oxidizing gas, the flue gases are passed through another crossflow scrubbing section 212, also containing packing, preferably one inch toroidal elements. Section 212 is washed with scrubbing liquid introduced at 213 and drains into sump 214 from whence it is recirculated by means of pump 215. This scrubbing liquid is preferably an aqueous caustic solution with the same pH and otherwise similar to the liquid in sump 108', except that it contains no activated carbon. Excess oxidizing gas and the products of oxidation are scrubbed from the gas in section 212. A slipstream 216 of the liquid, including scrubbed particulates, the products of oxidation, and excess chlorine, is bled off and returned to the bleaching portion of the pulp process, and additional concentrated caustic added at 217 to maintain pH and volume.

The twice-oxidized flue gas exiting from section 212 is then passed through another crossflow scrubbing section 220, also filled with packing material, preferably 1 inch toroidal elements. Section 220 serves as the convenient and efficient heat exchange chamber in which the hot incoming gases contact a cool fluid, either fresh cool water or recycled cool water from the pulp facility, which is sprayed into the top of the section by means of nozzles 221 and which drains and collects by gravity into sump 222. The hot water collected in sump 222 is withdrawn by means of pump 223 to the main pulp process for recovery of heat via pipe 224. A portion of the hot water is also pumped by means of pipe 225 to the inlet duct 226 for the flue gases in advance of the fan 100'. Such relatively pure water for cooling and moisturizing the incoming gases in advance of the fan is preferable to the liquid from sump 108' to avoid the collection of precipitated solids on the walls of the incoming duct. Such collection is not normally a problem with respect to components of the apparatus downstream of the fan. An emergency inlet pipe 227 is also provided to admit cooling water to quench surges of unduly hot incoming gas.

As previously indicated, cooling the gases in chamber 220 will remove additional residual particulates and suspended liquids from the gas. The concentrations thereof will often be too small to cause problems when fresh cooling water is employed, but may build up with time where the cooling water is recycled. Under such conditions, or where relatively pure water is otherwise desired, the sump 222 may be segregated into two or more sumps of increasing purity downstream in the direction of gas movement, downstream sumps providing increasingly pure water for such use. Also, the cooling water flow rate can be adjusted to provide any desired outlet temperature for the heated water up to approximately the temperature of the gases exiting from section 212. Such heat recovery is an important part in the total economics of the process and can reduce the cost of operation considerably. In one design for treating the flue gases exiting from a 600 ton per day pulp mill, it has been found that $1.6 \times 10^8$ BTU/HR can be recovered in the form of hot water at a temperature approximating saturation temperature of the flue gases, for example 160° F.

While FIG. 6 illustrates the optional secondary oxidative treatment by means of an oxidizing gas, other suitable nongaseous oxidizing agents may be added to the liquid circulating through scrubbing section 212 through spray nozzles 213 and sump 214. Gases containing chlorine are preferred since they are effective and conveniently used, and since these are the materials commonly employed in bleaching portions of pulp processes. Excess gas, recovered in the scrubbing liquid, can be sent to such bleaching operations for use.

EXAMPLE VI

A typical design for the integrated recovery apparatus illustrated in FIG. 6, with flue gases from a pulp process as illustrated in FIG. 1, has the operating conditions as shown in TABLE II below, wherein the terms employed have the units and definitions stated in TABLE I.

TABLE II

| Gas Conditions: | | Inlet ($S_i$) | Outlet ($S_o$) |
|---|---|---|---|
| Flow, ACFM | | 275,000 | 148,800 |
| Temp., dry bulb | | 300° F. | 100° F. |
| wet bulb | | 160° F. | 100° F. |
| Concentration, | SOx | | |
| | Particulates | 1.5 | 0.04 |
| | TRS | 600 | 2 or less |
| Treating Materials: | | Flow Rate: | |
| Sump 108 (at about 163° F.): | | | |
| Fan Wash (207) | | 150 gpm | |
| Venturi spray, top | | 1750 gpm | |
| Venturi insert (104') spray | | 750 gpm | |
| Baffle spray (204) | | 825 gpm | |
| Scrubbing spray (205) | | 3735 gpm | |
| Scrubbing spray (206) | | 3465 gpm | |
| Slipstream (121') | | 24 gpm at about 20% non-volatiles | |
| Make-up carbon (124') | | 5-20 lbs/hr | |
| NaOH make-up (123') | | 250-1200 lbs/hr | |
| Compressed air (126') | | about 2000 acfm at 10 PSIG | |
| Chlorine gas (210) | | 2-10 acfm | |
| Sumps 214 and 222: | | | |
| Scrubbing liquid (213) | | 400 gpm at about 163° F. | |
| Slipstream (216) | | 0.5 gpm | |
| NaOH make-up (217) | | 25-125 lbs/hr | |
| Cooling Water (221) | | 3600 gpm at about 51° F. | |
| Hot Water (224) | | 3870 gpm at about 156° F. | |
| Hot Water Spray (225) | | 80 gpm | | lbs/hr — pounds per hour
PSIG — pounds per square inch gauge
All gallons are U.S. measure While demister 128' is shown in FIG. 6 as the last packed section in the process, it can precede heat exchange section 220. Where clean water is requied such position reversal has the advantage that entrained liquids with any impurities contained therein are removed in advance of heat recovery. Where the units 128' and 220 are thus reversed, sump 222 can be divided into two sumps, the first (in the direction of gas flow) receiving the entrained liquid draining from demister 128', with a separate discharge, and the second receiving the heated water as shown in FIG. 2, but omitting any demister drainage. One form of crossflow heat-exchange apparatus is described in U.S. Pat. No. 3,759,496.

In the foregoing description of concentrations of activated carbon, the concentrations stated, and the comparisons with prior art given, were for activated carbon of low density, made for example from wood bark. Activated carbons vary in density from about 0.08 to about 0.5. By low density as used herein are meant those having density below about 0.2. Where more dense forms of activated carbon are employed, for example activated carbon made from coal, the carbon concentration should be increased two to three times to compensate for its lower surface area and greater tendency to settle in the slurry. Thus the preferred range for low density carbon is from 0.03 to about 0.2% by weight of slurry as stated. The upper limit for high density carbons should be increased to about 0.6%. A similar increase is required with prior art processes and the present invention has the advantage of lower requirements when activated carbons of equal densities are compared. Higher amounts of carbon can be used but are not required and do not provide benefits to warrant the increased cost.

Having described the invention, what is claimed is:

1. A process for treating an effluent gas containing entrained particulates a portion of which are below 1 micron in size, acid gas components, and a compound selected from the group consisting of $H_2S$, lower alkyl mercaptans, lower alkyl sulfides and lower alkyl disulfides, said gas having a temperature above 150° F., which comprises:
   a. initiating nucleation of the particulates in a first enclosure by treating the gas to increase its turbulence and to increase its humidity substantially to saturation at a temperature above about 150° F. to about 212° F. under substantially adiabatic conditions, the pressure drop of said gas in said first enclosure being less than about 20 inches of water;
   b. passing said saturated gas which is at a temperature above about 150° F. to about 212° F. in a substantially horizontal path through a second enclosure containing packing;
   c. passing a scrubbing liquor comprising an aqueous alkaline slurry of activated, oxygenated carbon downwardly over said packing under laminar flow conditions;
   d. exhausting said gas from said second enclosure; and,
   e. collecting at least a portion of said liquid after passage through said packing and recirculating said liquid portion to said packing, said recirculating liquid portion containing at least about 15% nonvolatile material by weight.

2. The process of claim 1 wherein the increase in turbulence of the gas stream is sufficient to reduce the particulate content of said exhausted gas to not more than about 0.08 gr/sdcf.

3. The process according to claim 1 wherein the turbulence of the gas is increased in said first enclosure to a Reynolds number greater than about 10,000, the pressure drop of the gas in passing through said first enclosure being below about 20 inches of water.

4. The process of claim 3 wherein said increase in turbulence and increase in humidity is by the step of passing said gas stream through a venturi and simultaneously quenching it by contact with an aqueous quenching liquor.

5. The process of claim 3 wherein said increase in turbulence and increase in humidity is by the step of passing said gas stream through a set of baffles which are continuously washed with an aqueous washing liquor.

6. The process of claim 3 wherein said increase in turbulence and increase in humidity is by the steps of passing said gas stream through a venturi and simultaneously quenching it by contact with a recirculated portion of said scrubbing liquor and passing the gas stream through a set of baffles which are continuously washed with a recirculated portion of said scrubbing liquor.

7. The process according to claim 1 wherein said slurry has a pH below about 9.5 and a concentration of activated carbon between about 0.03% and about 0.6% by weight.

8. The process according to claim 1 wherein said slurry is recirculated through said packing at a substantially constant temperature, which is approximately the same as the gas which is above about 150° F. to about 212° F.

9. The process of claim 1 comprising the further step of bringing said gas from said second enclosure into contact with an aqueous washing liquid which is at a temperature below that of the gas to remove a further portion of residual contaminants.

10. The process according to claim 1 wherein a portion of said slurry is recirculated to said first enclosure to provide moisture for saturation therein, said another portion of said slurry is recirculated through said packing, said slurry having a constant heat content except for withdrawal of a slipstream and addition of makeup materials sufficient to maintain the volume, concentrations and pH thereof.

11. The process according to claim 1 wherein the flow rate of slurry is greater in upstream portions of said packing than in downstream portions of said packing, said upstream and downstream portions being with respect to the direction of flow of the gas, whereby greater amounts of alkali and carbon contact the gas at locations where the gas has relatively high concentrations of components to be removed therefrom.

12. The process according to claim 1 wherein said slurry is collected in a sump below said packing and wherein said carbon is oxygenated in said sump.

13. The process according to claim 11 wherein the packing comprises a plurality of toroidal elements, said elements being larger in upstream portions than in downstream portions of said packing, said upstream and downstream portions being with respect to the direction of flow of the gas therethrough.

14. The process of claim 1 wherein contact between said effluent gas and said slurry causes oxidation and removal of at least a portion of said sulfur compounds, the process including as a further step, subsequently contacting said effluent gas with oxidizing agent means more powerful than oxygen and scrubbing the gas with an alkaline aqueous liquid to remove additional sulfur compounds therefrom.

15. The process of claim 14 wherein said oxidizing agent means is chromic acid, a chlorine containing gas, or an alkali metal or alkaline earth metal hypochlorite, permanganate or chromate.

16. The process of claim 15 wherein said oxidizing agent means is chlorine and said alkaline aqueous liquid has a pH less than about 9.5.

17. A process for treating effluent gases from a pulp recovery boiler, said gas containing particulates a portion of which are below 1 micron in size, oxides of sulfur, hydrogen sulfide and organic sulfur compounds, said effluent gases having a temperature above about 150° F., said process comprising as steps:
   a. treating said gas in a first enclosure to increase its turbulence to a Reynolds number of at least about 10,000 and to increase its humidity to saturation at a temperature above about 150° F. and under substantially adiabatic conditions, said first enclosure including a low energy venturi, the pressure drop of the gas in passing through said first enclosure being less than about 20 inches of water,
   b. thereafter passing said gas in a substantially horizontal path through a second enclosure containing packing elements,
   c. passing an aqueous alkaline slurry of oxygenated, activated carbon downwardly over said packing and through said second enclosure under substantially laminar flow conditions, the flow rate of the slurry through upstream portions of the packing exceeds the flow rate through downstream portions of the packing, said upstream and downstream portions being with respect to the direction of gas flow through the packing, d. recirculating said slurry at a pH of less than about 9.5, at a non-volatile content of between at least about 15% by weight, a carbon concentration of between about 0.03% to 0.6% by weight, and at a substantially constant temperature approximately the same as said gas saturation temperature which is above about 150° F. to about 212° F., and e. exhausting said gas from the second enclosure.

18. The process according to claim 17 wherein the consumption of carbon is less than about 0.6 pounds and the consumption of caustic as NaOH is less than about 25 pounds per ton of air dried pulp processed.

19. The process according to claim 17 wherein a portion of said slurry is recirculated to said first enclosure to provide the water to saturate said gas, the slurry being recirculated at constant heat content except for withdrawal of a slipstream and addition of makeup sufficient to maintain volume, concentration and pH thereof.

20. The process according to claim 19 wherein said slurry is collected in a sump below at least one of said enclosures and wherein said carbon is oxygenated in said sump.

21. The process according to claim 17 wherein the packing elements in an upstream portion of the packing are larger than the elements in a downstream portion.

22. The process of claim 17 comprising the further step of bringing said gas from said second enclosure into contact with an aqueous washing liquid which is at a temperature below that of the gas to remove a further portion of residual contaminants.

23. The process according to claim 17 wherein said gas is introduced into said first enclosure by means of a fan wetted with an aqueous liquid.

24. The process of claim 17 comprising as a further subsequent step, mixing chlorine with the gas and scrubbing additional sulfur compounds therefrom with an alkaline aqueous liquid having a pH less than about 9.5.

25. The process of claim 1 comprising the further subsequent step of passing said gas horizontally through an additional enclosure containing packing, and passing a fluid cooler than said gas downwardly over said packing to recover heat from the gas.

26. The method according to claim 17 wherein said slurry has a concentration of activated carbon of low density between about 0.03% and about 0.2% by weight.

27. Apparatus for treating effluent gas having a temperature above about 150° F. and containing contaminants to be removed, said apparatus comprising (a) a first enclosure and within said first enclosure, a washed venturi for increasing the turbulence of the gas and for saturating the gas with moisture under substantially adiabatic conditions at a temperature above about 150° F. up to about 212° F., said venturi having a gas pressure drop therethrough less than about 20 inches of water; (b) a second enclosure and, within said second enclosure, a packing material; means for passing said gas in a substantially horizontal path through said second enclosure; means for passing an aqueous alkaline carbon slurry downwardly over said packing in substantially laminar flow, means for varying the flow rate of slurry over said packing such that portions of the packing upstream can receive a greater flow than downstream portions, said upstream and downstream portions being with respect to the direction of gas flow therethrough; (c) means for collecting and recirculating said slurry; (d) means for oxygenating said carbon; (e) means for withdrawing portions of said slurry and means for adding fresh alkali and carbon to maintain a predetermined volume of slurry in the apparatus and to maintain the pH, the carbon concentration, and the non-volatile content; (f) a third enclosure filled with packing material downstream of said second enclosure with respect to the gas flow path, said third enclosure being disposed substantially vertically across the horizontal flow path of said gas, and means for passing water at a temperature below the temperature of the gas downwardly over said packing in the additional enclosure in heat exchange contact with the gas; and (g) means for exhausting said gas.

28. Apparatus according to claim 27 wherein said apparatus is housed in a single, compact housing and wherein the means for collecting the slurry comprises a sump within the housing and below at least one of said enclosures, the means for oxygenating said carbon being located in said sump.

29. Apparatus according to claim 27 further comprising an additional enclosure containing packing material, said additional enclosure being disposed substantially vertically across the horizontal flow path of said gas downstream of said second enclosure, means for passing an aqueous alkaline liquid downwardly over said packing, means for collecting and recirculating said liquid, means for contacting said gas with an oxidizing agent in the third enclosure or in a space between said second and third enclosures, and means for adding fresh alkali to said liquid to maintain substantially constant volume and pH.

30. A process for treating an effluent gas at a temperature above about 150° F. and containing particulates a portion of which are below 1 micron in size, acid gas components, and oxidizable hydrogen and lower alkyl compounds of sulfur, the process comprising as steps:

a. treating said gas in a first enclosure to increase its turbulence to a Reynolds number of at least about 10,000 and to increse its humidity to saturation at a temperature above about 150° F. and under substantially adiabatic conditions, the pressure drop of the gas in passing through said first enclosure being less than about 20 inches of water;

b. thereafter passing said gas in a substantially horizontal path through a second enclosure containing packing;

c. passing an aqueous alkaline slurry of oxygenated, activated carbon downwardly over said packing and through said second enclosure under substantially laminar flow conditions;

d. recirculating at least a portion of said slurry at a substantially constant temperature approximately the same as said gas saturation temperature, approximately the same as the saturated gas which is above about 150° F. to about 212° F., a pH of less than about 9.5, a non-volatile content of at least about 15% by weight, and a carbon concentration of between about 0.03 per cent to 0.6 per cent by weight;

e. passing said gas in a substantially horizontal path through an additional enclosure containing packing in heat exchange relation with water cooler than said gas, said water passing downwardly over said packing; and f. exhausting said gas.

31. The process of claim 30 comprising the additional step, after passage through said second enclosure, of contacting the gas with oxidizing means more powerful than oxygen and cross-flow scrubbing additional oxidized compounds of sulfur from the gas with an alkaline aqueous liquid.

32. The process of claim 31 wherein said oxidizing means is chlorine.

33. In a process for the adsorption, oxidation and removal of odoriferous sulfur-containing compounds from a gas stream containing a member selected from the group consisting of $H_2S$, lower alkyl mercaptans, lower alkyl sulfides, and lower alkyl disulfides by contact with an aqueous alkaline slurry of activated carbon, the improvement wherein said slurry is oxygenated and introduced to the top of an enclosure containing packing and passed downwardly over said packing under laminar flow conditions, and said gas is passed transversely through the packing in contact with said slurry; whereby the carbon has a greater effective concentration at the contacting surface than in the bulk of said slurry.

34. The process according to claim 33 wherein said packing comprises a plurality of toroidal packing elements.

35. The process according to claim 33, wherein the carbon concentration in said slurry is between about 0.03 and about 0.6% by weight, the slurry has a pH below about 9.5, and said slurry is recycled at a substantially constant temperature with a non-volatile content of at least about 15% by weight.

36. The process according to claim 33 comprising the further step of recoverying heat by passing said gas, after contaact with said alkaline carbon slurry, transversely through another packed enclosure, and passing water cooler than the gas downwardly over said packing in heat exchange contact with the gas.

37. The process according to claim 33 comprising a second oxidative step of contacting said gas, subsequent to exposure to said carbon slurry, with an oxidizing agent more powerful than oxygen and cross-flow scrubbing additional compounds of sulfur therefrom with an alkaline aqueous liquid.

* * * * *

UNITED STATES PATENT OFFICE
CERTIFICATE OF CORRECTION

Patent No. 4,049,399       Dated    September 20, 1977

Inventor(s)    Aaron Joseph Teller

It is certified that error appears in the above-identified patent and that said Letters Patent are hereby corrected as shown below:

The term of this patent subsequent to

May 18, 1993, has been disclaimed.

Signed and Sealed this

Twenty-seventh Day of December 1977

[SEAL]

Attest:

RUTH C. MASON  
Attesting Officer

LUTRELLE F. PARKER  
Acting Commissioner of Patents and Trademarks